(12) United States Patent
Schrack (10) Patent No.: US 7,395,095 B2
(45) Date of Patent: Jul. 1, 2008

(54) MOBILE COMMUNICATION TERMINAL

(75) Inventor: Cornelia Schrack, Ulm (DE)

(73) Assignee: Nokia Corporation, Espoo (FI)

( * ) Notice: Subject to any disclaimer, the term of this patent is extended or adjusted under 35 U.S.C. 154(b) by 167 days.

(21) Appl. No.: 10/856,013

(22) Filed: May 28, 2004

(65) Prior Publication Data

US 2005/0266892 A1 Dec. 1, 2005

(51) Int. Cl.
*H04M 1/00* (2006.01)

(52) U.S. Cl. .............. 455/569.1; 455/575.1; 455/90.3; 455/128; 455/347

(58) Field of Classification Search ............. 455/575.1, 455/456.1, 569, 569.1, 90.3, 128, 347; 361/748
See application file for complete search history.

(56) References Cited

U.S. PATENT DOCUMENTS 6,011,699 A * 1/2000 Murray et al. ............... 361/814
6,952,350 B2 * 10/2005 Finney et al. ................ 361/748
6,980,828 B2 * 12/2005 Nousiainen ............... 455/556.1
2003/0032443 A1 * 2/2003 Johnson et al. ............. 455/550
2003/0086562 A1 5/2003 Wong et al. ............ 379/420.01
2004/0203996 A1 * 10/2004 Hansson ................... 455/550.1
2005/0233781 A1 * 10/2005 Erixon et al. ............ 455/575.1

FOREIGN PATENT DOCUMENTS

EP          1 271 793        1/2003
WO        WO 02/054509      7/2002
WO       WO 2004/032465     4/2004

* cited by examiner

*Primary Examiner*—Duc Nguyen
*Assistant Examiner*—Wayne Cai
(74) *Attorney, Agent, or Firm*—Perman & Green, LLP (57) ABSTRACT

A mobile communication terminal with an acoustic chamber for a hands-free speaker. The acoustic chamber is closed or sealed by a removable lid that checks or mates with the chassis or with rear cover of the terminal. The removable lid is arranged to be secured in a releasable manner, allowing access to the acoustic chamber for repairing or replacing the speaker.

22 Claims, 10 Drawing Sheets

MOBILE COMMUNICATION TERMINAL

BACKGROUND OF THE INVENTION

1. Field of the Invention

The present invention relates generally to the field of mobile communication terminals, and specifically to a mobile communication terminal with an acoustic chamber for a hands-free speaker.

2. Brief Description of Related Developments

The demand for new features in portable communications equipment, such as mobile telephones, continues to rise, while the size of these devices remains the same or is required to become even smaller. Some of these new features relate to the audio aspects of mobile telephones. For example, integrated hands-free devices require a significant improvement in speaker quality and sound intensity compared with the earphone speaker arrangement provided in conventional mobile telephones. Similarly, an improvement in speaker quality is required as mobile telephone speakers are increasingly used to play polyphonic ring-tones, downloaded midi files, FM radio and so on.

An increase in speaker performance can be brought about by the use of an acoustic chamber, in much the same way as a conventional audio system loudspeaker requires a speaker enclosure. One particular requirement to the acoustic chamber is that it has to be completely sealed. Even small leakages will cause a significant decrease in the speaker performance and quality.

In prior art solutions it is known to use a permanently sealed box which is integrated in the cover, in an antenna unit or in the chassis of the phone. These usually plastic material prior art boxes have been sealed by ultrasonic welding or double sided adhesive gaskets, and if opened the box was destroyed. However, if the speaker is permanently integrated in the cover and for some reason it has to be repaired or needs maintenance, the whole cover (which could include the antenna), the whole chassis or the complete antenna unit, has to be exchanged.

SUMMARY OF THE INVENTION

The invention described below provides a mobile communication terminal including at least one speaker for hands free operation and an acoustic chamber in which the speaker is received. The acoustic chamber is formed by a structural part of the mobile communication terminal in combination with a removable lid for allowing replacement of the speaker.

BRIEF DESCRIPTION OF THE DRAWINGS

In the following detailed portion of the present description, some embodiments of the invention will be explained in more detail with reference to the exemplary embodiments shown in the drawings, in which.

DETAILED DESCRIPTION

Figure 1:
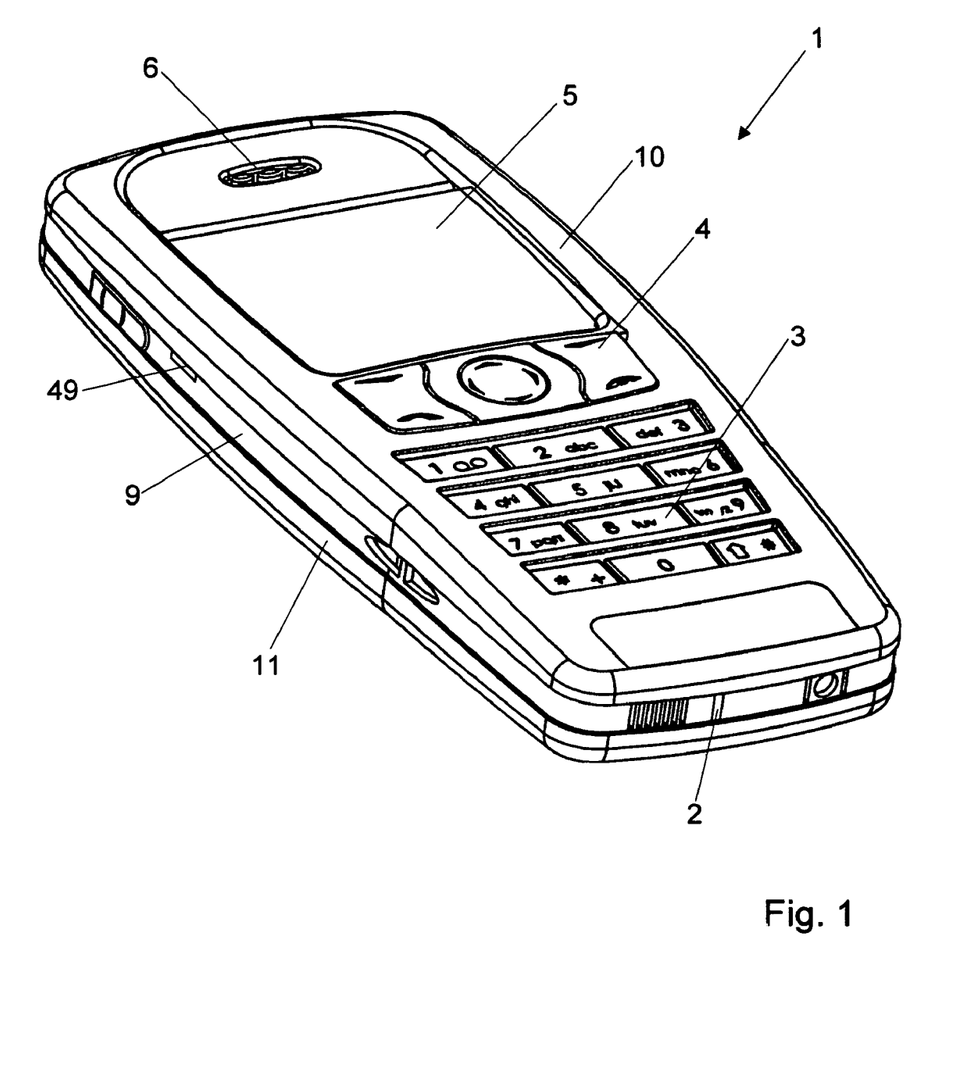
FIG. 1 is a perspective front view of a mobile telephone.
Figure 2:
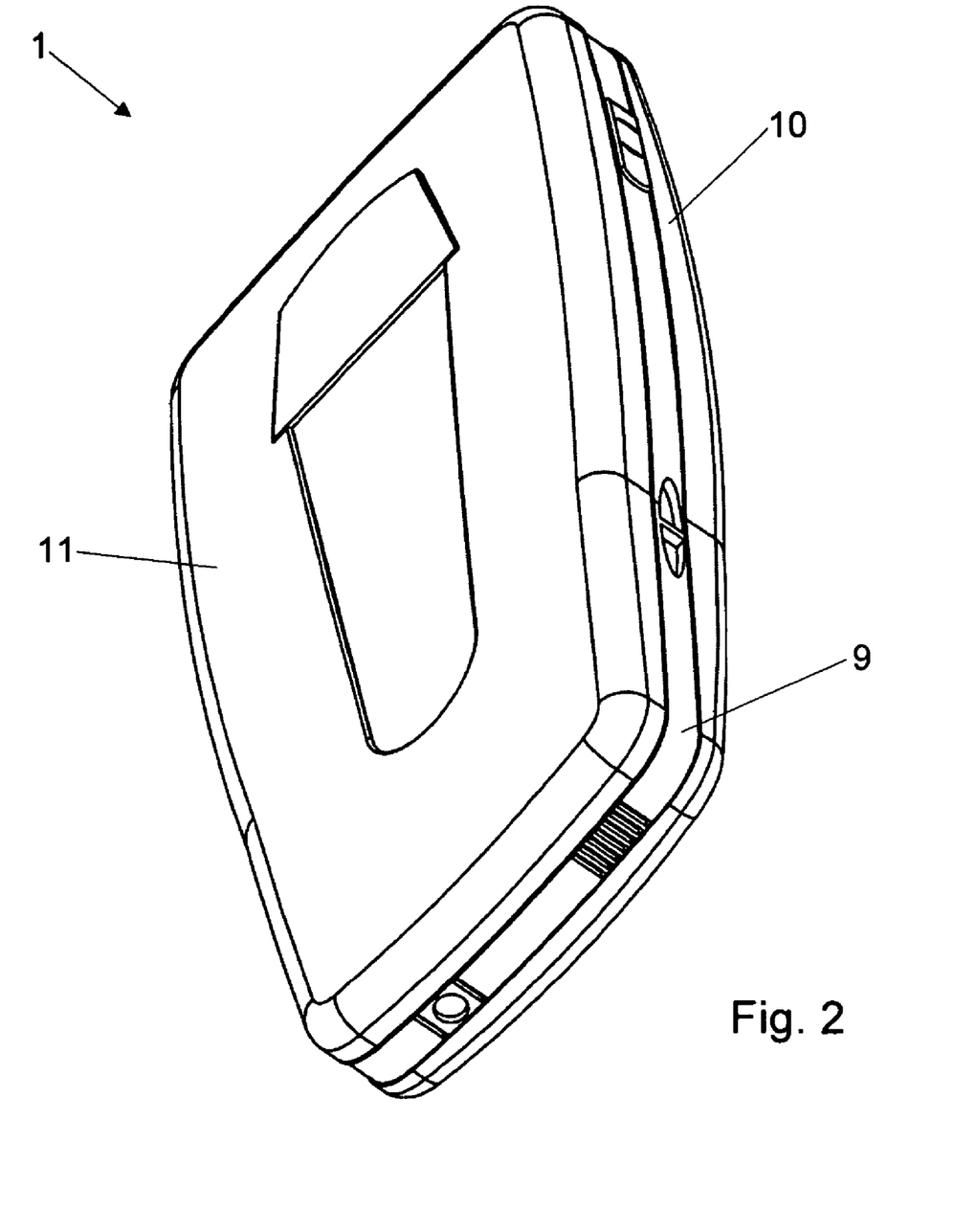
FIG. 2 is a perspective rear view of the mobile telephone shown in FIG. 1.
Figure 4:
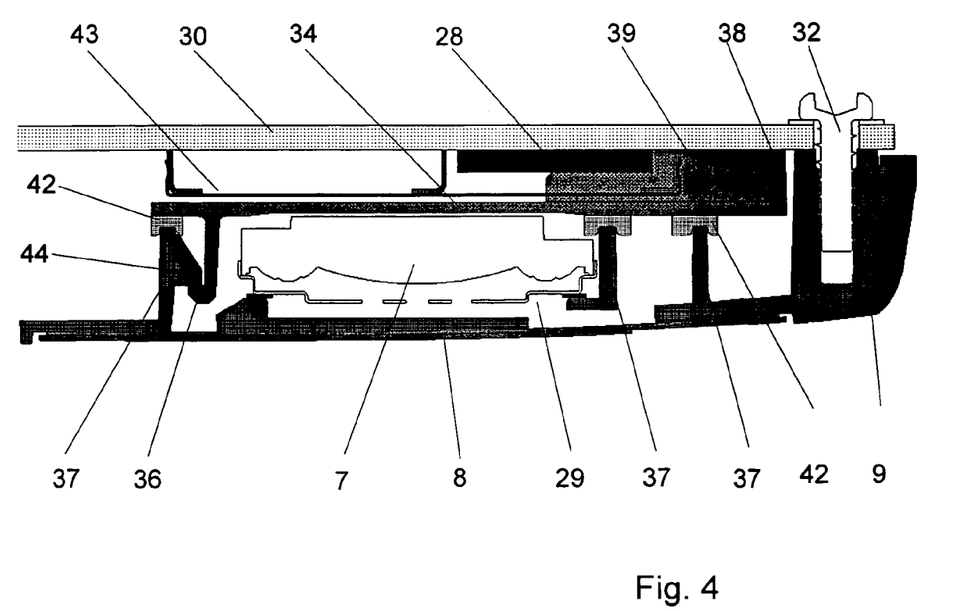
FIG. 4 is a diagrammatic cross-sectional view of the rear of the handset shown in FIG. 1, when assembled.

Referring to FIGS. 1 and 2, a mobile phone 1 includes a microphone 2, keypad 3, a hands-free mode selection key 4, an LCD display 5, an earphone speaker 6. The mobile phone referring to FIG. 4, also includes a hands-free speaker 7 and an internal antenna 8. The location of the hands-free speaker 7 and antenna 8 are illustrated in FIG. 4, which shows a cross-section of the mobile phone. The mobile phone 1 includes a chassis 9 to which a user exchangeable front cover 10 and a user exchangeable rear cover 11 are attached.

Figure 3:
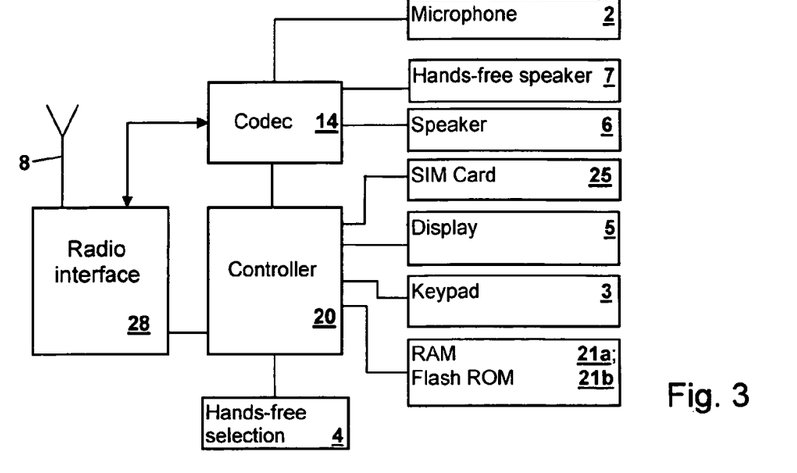
FIG. 3 is a schematic diagram illustrating the general architecture of the telephone circuitry of the mobile phone of FIG. 1.

FIG. 3 illustrates the major circuit components of the mobile phone 1. Signal processing is carried out under the control of a digital micro-controller 20 which has an associated flash memory 21a and random-access memory 21b. Electrical analogue audio signals are produced by microphone 2 connected to the Codec (Digital signal processor) 14. Similarly, analogue audio signals are fed to the earphone speaker 6 or to the hands-free speaker 7 through a not shown amplifier, depending on which speaker is selected. The micro-controller 20 receives instruction signals from the keypad 3 and hands-free mode selection key 4 and controls operation of the LCD display 5. The hands-free mode selection key 4 is used to instruct the micro-controller 20 to switch between the earphone speaker 6 and hands-free speaker 7, 7.

Information concerning the identity of the user is held on a smart card 25 in the form of a GSM SIM card which contains the GSM international mobile subscriber identity (IMSI) and an encryption key $K_i$ that is used for encoding the radio transmission in a manner well known per se.

The mobile telephone circuitry includes a codec 14 and an RF stage 28 feeding the antenna 8.

The mobile station 1 is operable to communicate through cellular radio links with individual PLMNs (public land mobile network), for example a GSM 1800 MHz network.

FIG. 4 is a diagrammatic cross-sectional view of the mobile phone 1, not showing all incidental details. A main printed circuit board 30 is secured to the chassis 9 by means of screws 32. The chassis 9 is an integrally molded plastic substrate with an antenna pattern 8 plated into its outside surface, for example by using the molded interconnect device (MID) molding process. Alternatively, the antenna 8 can be attached to the chassis 9 with double sided tape. A foil Decolabel (not shown) may be secured with double sided tape to the antenna 8. In both attachment methods, the antenna 8 cannot be removed from the chassis 9 without destructing the antenna. Antenna 8 is thus placed at the rear side of the mobile phone 1 under the user exchangeable rear cover 11. A space for receiving components of the mobile phone 1 is formed between the chassis 9 and the printed circuit board 30. The chassis 9 is provided with a lip 37 extending towards the printed circuit board 30. The lip 37 forms the circumference of an acoustic chamber 29 in which the speaker 7 is received. In the present embodiment, the lip 37 forms a substantially rectangular outer wall for the acoustic chamber, and the resulting acoustic chamber 29 has a substantially cuboid shape. It is though also possible that the lip 37 forms a curved outer wall (not shown) for the acoustic chamber 29, e.g. a circular or elliptical outer wall.

The speaker 7 is attached to a removable lid 34 that checks or mates with the lip 37, so that when the removable lid 34 is fitted to the chassis 9, a sealed acoustic chamber 29 is formed. A continuous gasket 42 of a resilient material such as elastic foam is disposed between top of the lip 37 and the removable lid 34 to assist in the seal between the removable lid 34 and the lip 37. The gasket 42 can be attached with double sided tape to the removable lid 34 although any suitable attachment means may be used.

Figure 5:
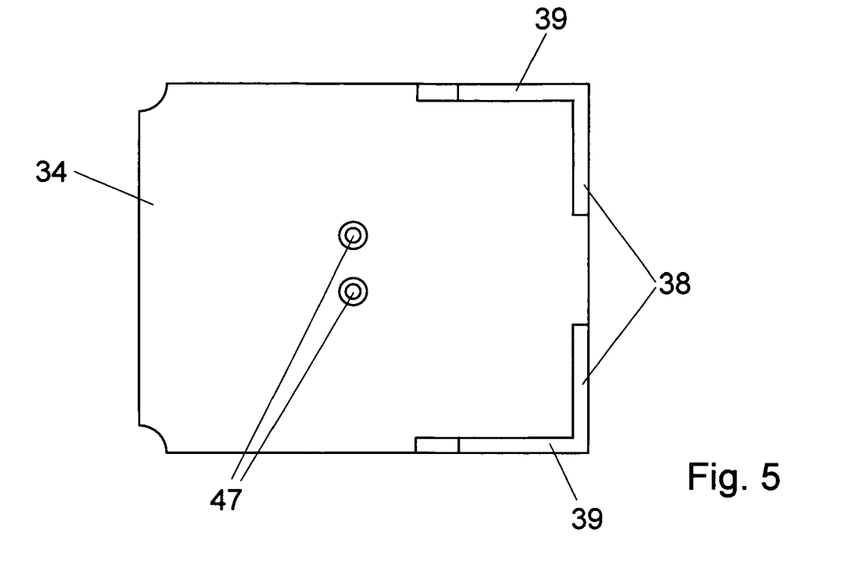
FIGS. 5, 6 and 7 are different views of schematic diagrams illustrating a removable lid for closing and opening the acoustic chamber of the mobile shown in FIG. 1.
Figure 6:
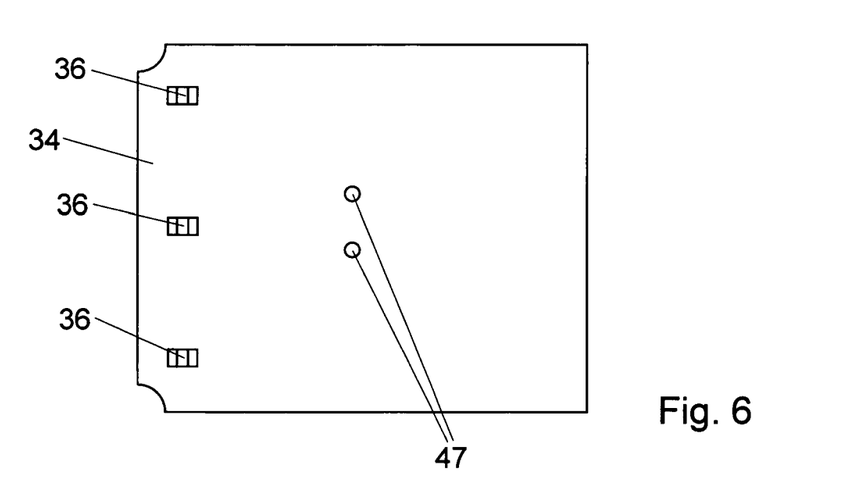
Figure 7:
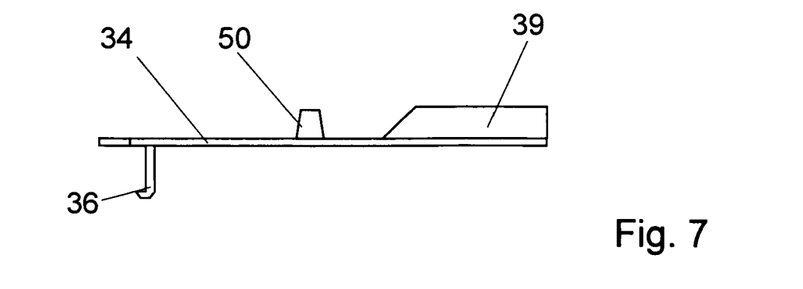

FIGS. 5, 6 and 7 show the removable lid 34 from above, below and the side, respectively. The removable lid 34 is provided with two apertures 47 and support protrusions 50 allowing passage of contact pins (not shown) for connecting the speaker 7 to the printed circuit board 30. On its bottom side the removable lid 34 is provided with for example, three snap hooks 36 for engaging a corresponding projection 44 (shown in FIG. 4) on the lip 37. The snap hooks 36 are disposed along one edge of the removable lid 34. The number of snap hooks 36 can be chosen in accordance with circumstances, and it is possible to have a removable lid without any snap hooks. The opposite edge of the removable lid 34 is provided with an upward ledge 38. The removable lid 34 is provided with further ledges 39 along its other two edges. The ledges 38,39 are intended for abutting with the printed circuit board 30.

In order to assemble the acoustic chamber 29, the removable lid 34 is placed on top of the lip 37 with the snap hooks 6 caught below protrusion 44. The edge of the removable lid 34 with the snap hooks 36 is thus secured to the chassis 9. Next, the printed circuit board 30 is secured to the chassis 9 by means of the screws 32 that are received in screwdomes of the chassis. In this operation the relatively rigid printed circuit board 30 abuts with the ledges 38,39 and urges the removable lid 34 towards the lip 37. Thereby, the gasket 42 is compressed and a hermetic seal between the lip 37 and the removable lid 34 is created.

The ledges 38,39 and the snap hooks 36 urge the edges of the removable lid 34 towards the lip 37. Even if the removable lid itself is relatively weak and flexible the hermetic seal between the removable lid 34 and the lip 37 can be maintained. The removable lid 34 may therefore be relatively thin and thus additional space for elements of the mobile phone 1 is created between the removable lid 34 and the printed circuit board 30. The gasket 42 realizes the seal between removable lid and chassis. To ensure the sealing a certain pressure onto the gasket 42 is needed. This pressure has is realized by the neighboring elements, e.g. the removable lid 34 and the lip 37 in the chassis 9). In the present embodiment this pressure is realized by deploying a snap connection on the one side and the pressure from PWB onto the ledges of the removable lid on the other side of the circumference of the gasket 42. When the removable lid has no snap hooks there will be ledges 38,39 on the edge of the removable lid where the snap hooks would have been. In the present embodiment the shielding 43 and the RF components 28 are disposed in the space between the printed circuit board 30 and the removable lid.

The removable lid 34 can easily be opened and closed for repair, replacement or maintenance of the speaker 7. Hereto, the screws 32 are removed, the printed circuit board 30 taken off and the removable lid 34 can be opened. When the loudspeaker 7 has e.g. been replaced the removable lid 34 is again placed on the lip 37 for sealing the acoustic chamber as described above. A small snap hook (not shown) may be provided on the side of the removable lid 34 opposite to the snap hooks 36 for securing the removable lid 34 during assembly. This small snap hook can be integral with the chassis 9 and snap over the removable lid 34 or vice versa. The small snap hook is configured to be accessible with e.g. a small screw driver or the like for releasing the small snap hook when the removable lid needs to be opened.

The removable lid 34 is shown as a flat rectangular plate, however, it is understood that the removable lid 34 can be formed by a non-flat and/or non-rectangular plate.

The acoustic chamber 29 is formed with an audio outlet 49 that leads to the side of the phone that allows the acoustic waves produced by hand free-speaker 7 to leave the acoustic chamber (FIG. 1).

Figure 8:
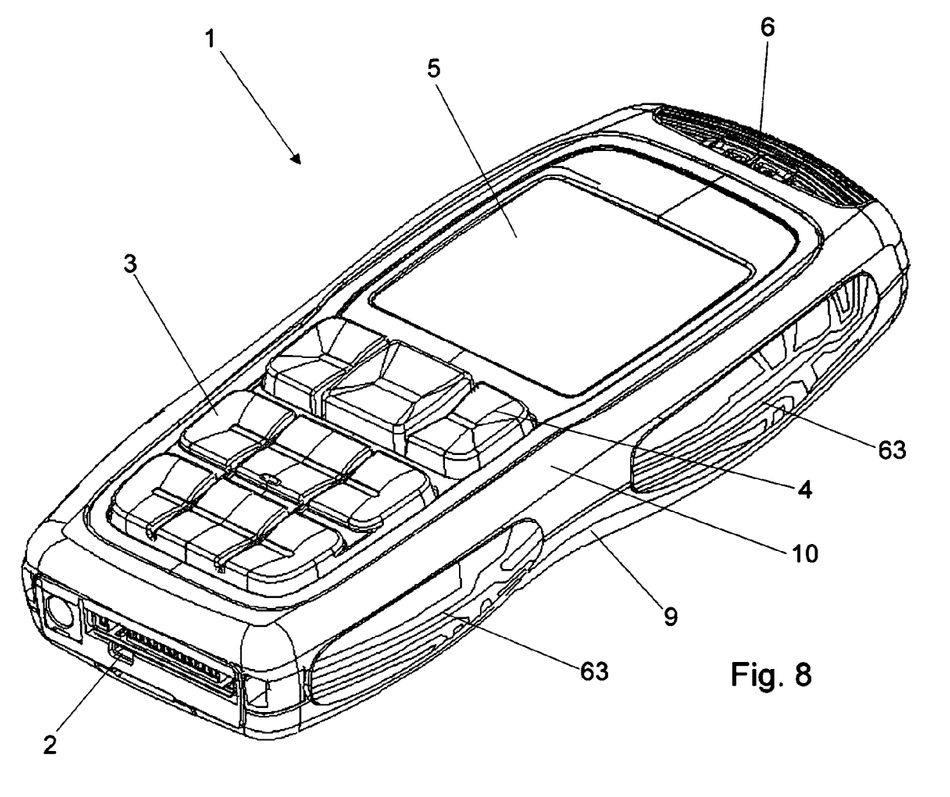
FIG. 8 is a perspective front view of a mobile telephone in a second embodiment.

FIG. 8 illustrates a second preferred embodiment of a mobile phone according to the invention in which reference numerals with like numbers represent like features. Further to the features described for the embodiment above the mobile phone 1 includes soft and elastic transparent pads 63 that facilitate holding the phone and give the user a more pleasant feeling when holding the phone. The pads 63 are transparent and several differently colored lights, such as LEDs (not shown) can emit light through the pads 63.

Figure 9:
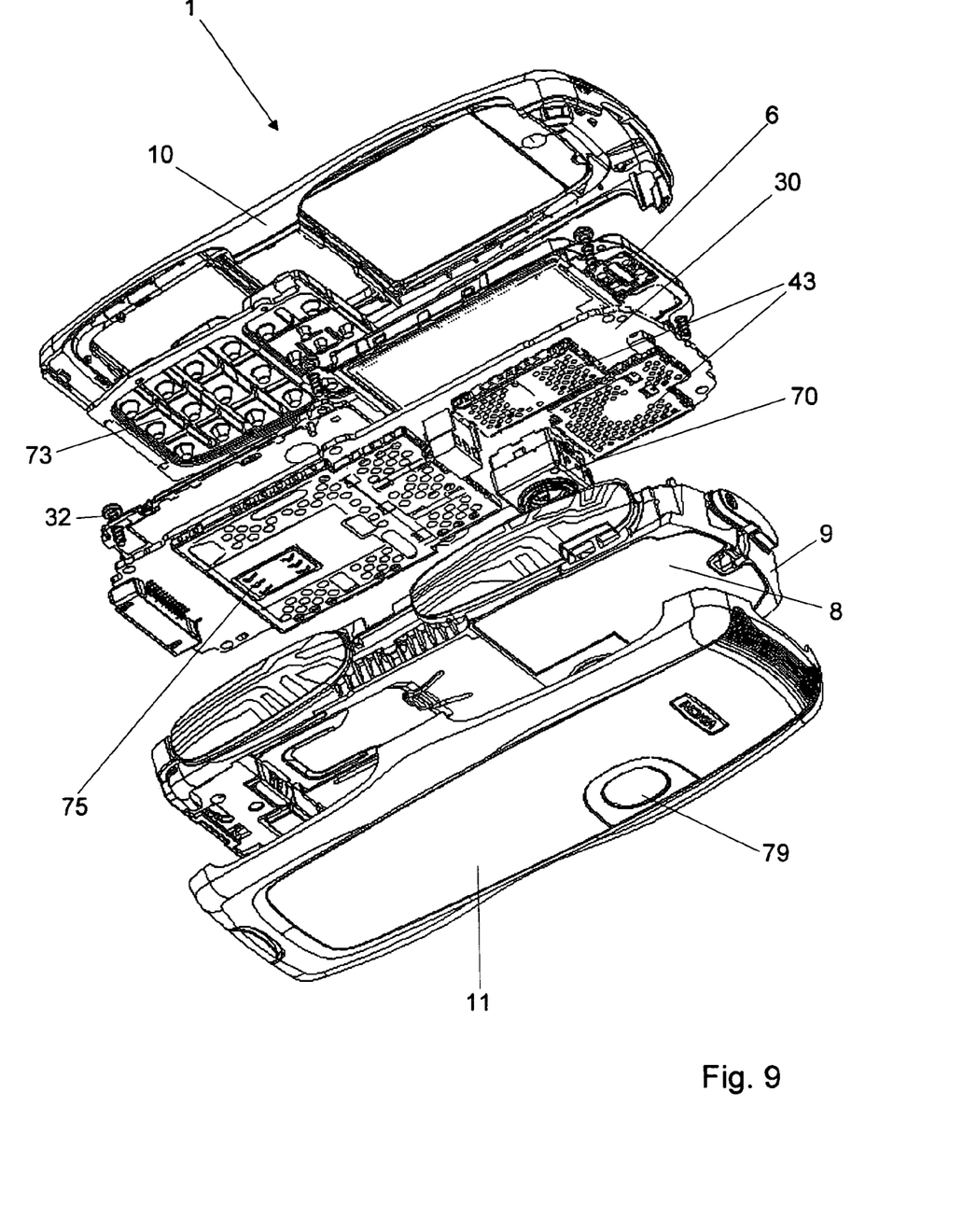
FIG. 9 is an exploded perspective view of the phone of FIG. 8 from the rear.
Figure 10:
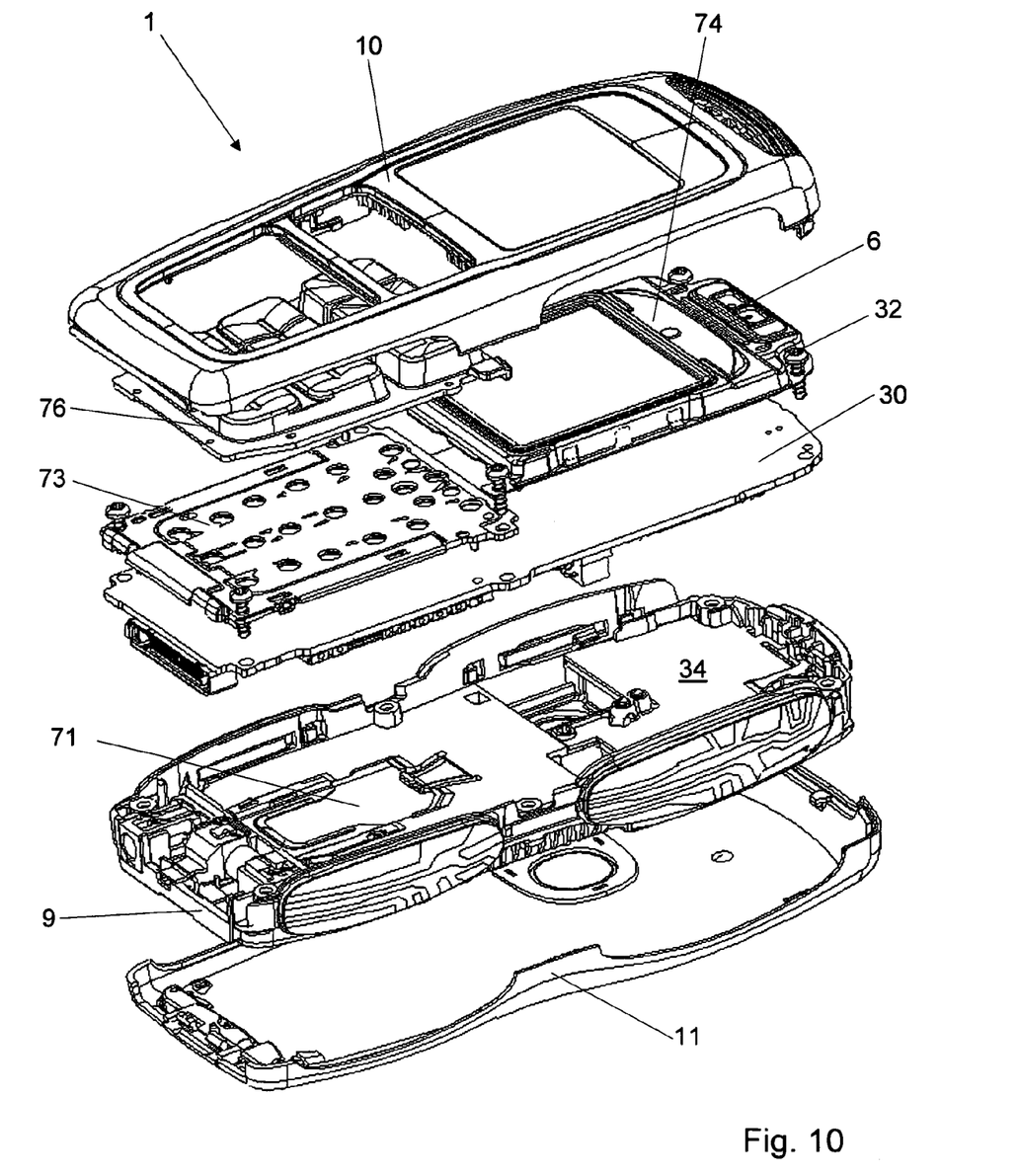
FIG. 10 is an exploded perspective view of the phone of FIG. 8 from the front.

FIGS. 9 and 10 illustrate the phone of FIG. 8 in a exploded views so that the components inside the phone can be seen to include a user exchangeable front cover 10, a keymat 76, a UI-shield assembly 74 that includes an LCD and an earphone speaker 6, a lightguide assembly 73, a printed circuit board 30, a chassis 9, with a SIM card slot 71 and with an antenna 8 covered by Decofoil secured thereto with double sided tape, and a user exchangeable rear cover 11 with a camera window 79. The antenna 8 is provided with pogo pins (not shown) for establishing contact with the printed circuit board 30. A digital camera 70 including a lens, a SIM card contact field 75 and shielding cans 43 are disposed on the back of the printed circuit board 30. A removable lid 34 for an acoustic chamber if a hands-free loudspeaker is disposed on the front of the chassis 9. The printed circuit board 30 is secured to the chassis 9 by six screws 32 that are received into six corresponding screw domes 67 in the chassis 9.

Figure 11:
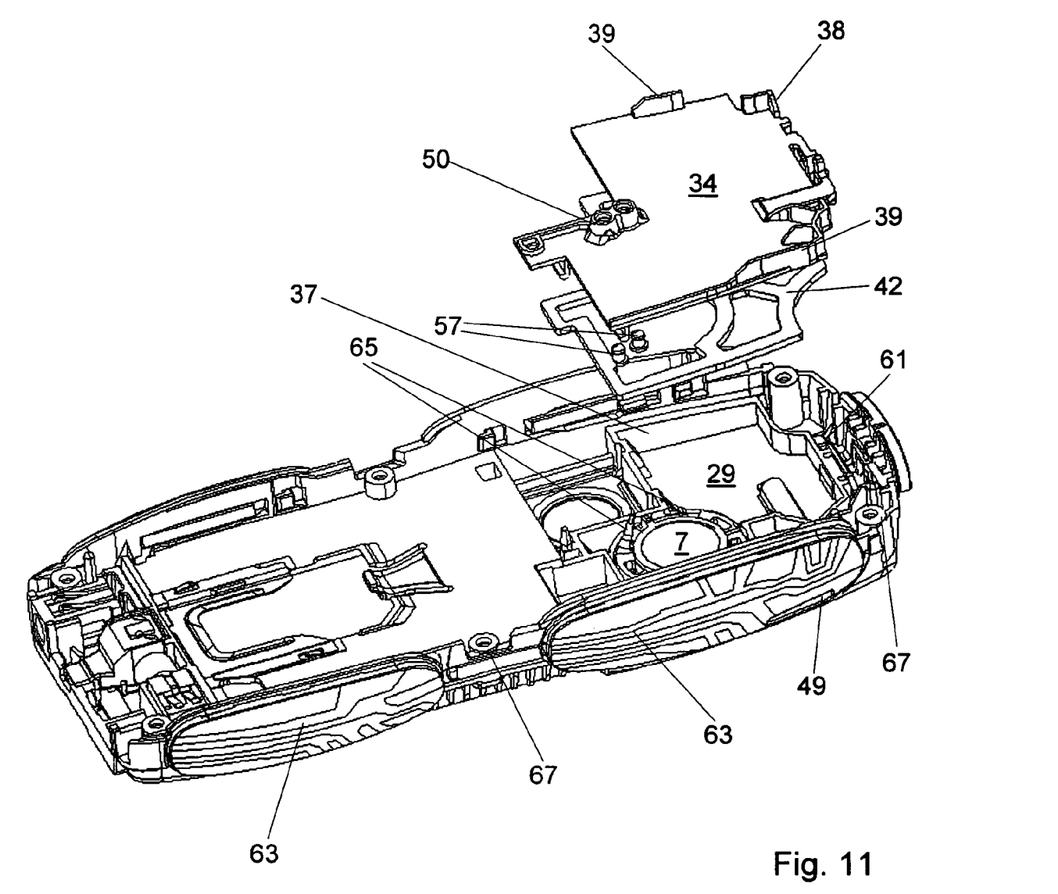
FIG. 11 is an exploded perspective view of the chassis and removable lid of the phone of FIG. 8.

FIG. 11 shows the removable lid 34 and the chassis in more detail. The hands-free speaker 7 is received in a recess in the front of the chassis. Two spring leave type contacts 65 of the hands-free speaker 7 urge two contact pins 57 towards the printed circuit board 30. The contact pins 57 are snapped into two apertures 47 that are formed in domes 50 in the removable lid 34. The removable lid 34 is provided with upward ledges 38, 39 that are intended for abutment with the printed circuit board 30. The gasket 42 that seals to or against the lip 37 that surrounds the acoustic chamber 29 is attached to the removable lid 34 with double sided tape. A small snap hook, that can be released for maintenance purposes with a small screwdriver or the like, 61 secures on one side of the removable lid to the chassis during assembly of the phone 1. The acoustic chamber 29 leads to an audio outlet 49 that allows the acoustic waves produced by the hands-free speaker 7 to leave the phone 1.

Figure 12:
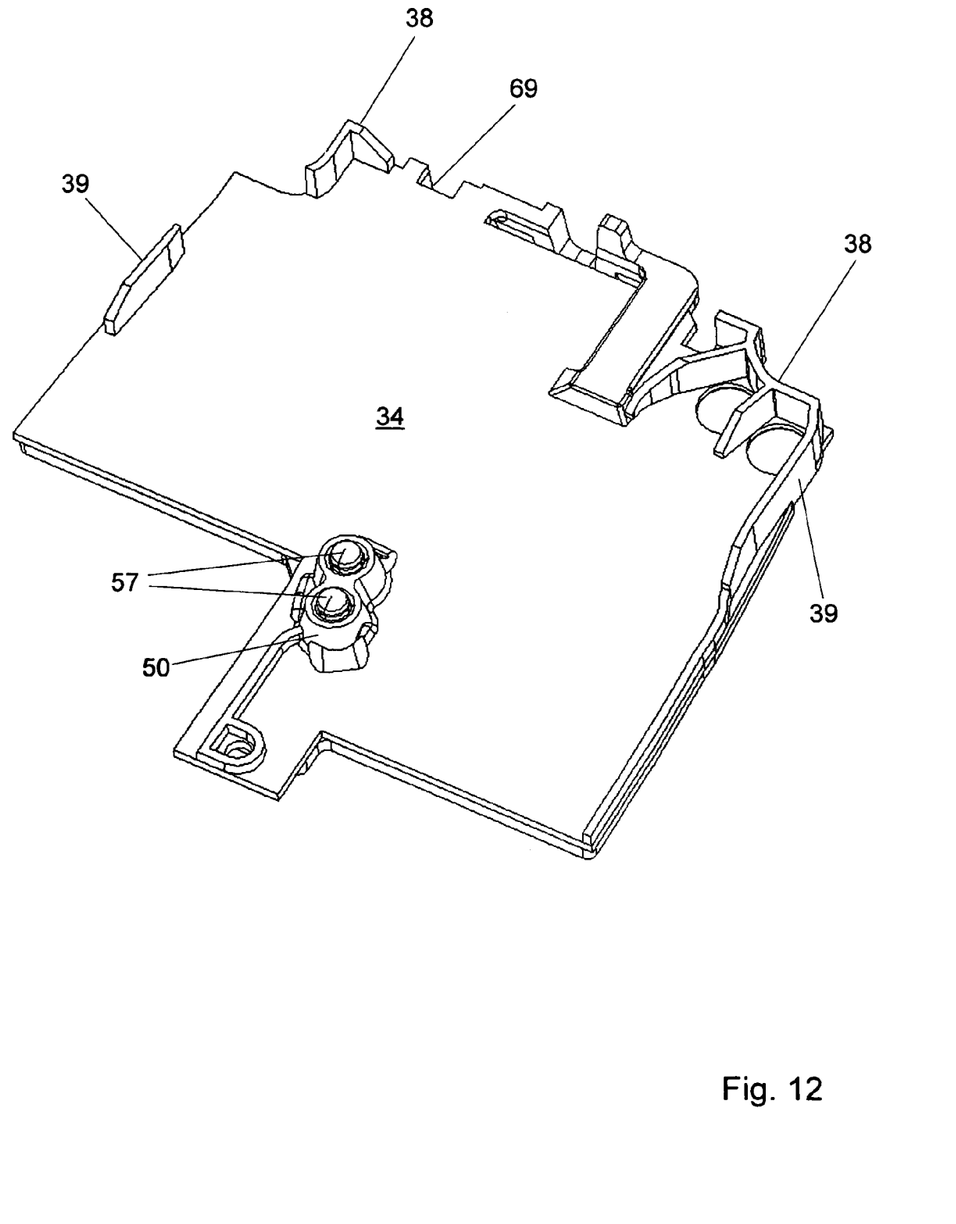
FIG. 12 is a perspective view in detail on the top of the removable lid of FIG. 11.
Figure 13:
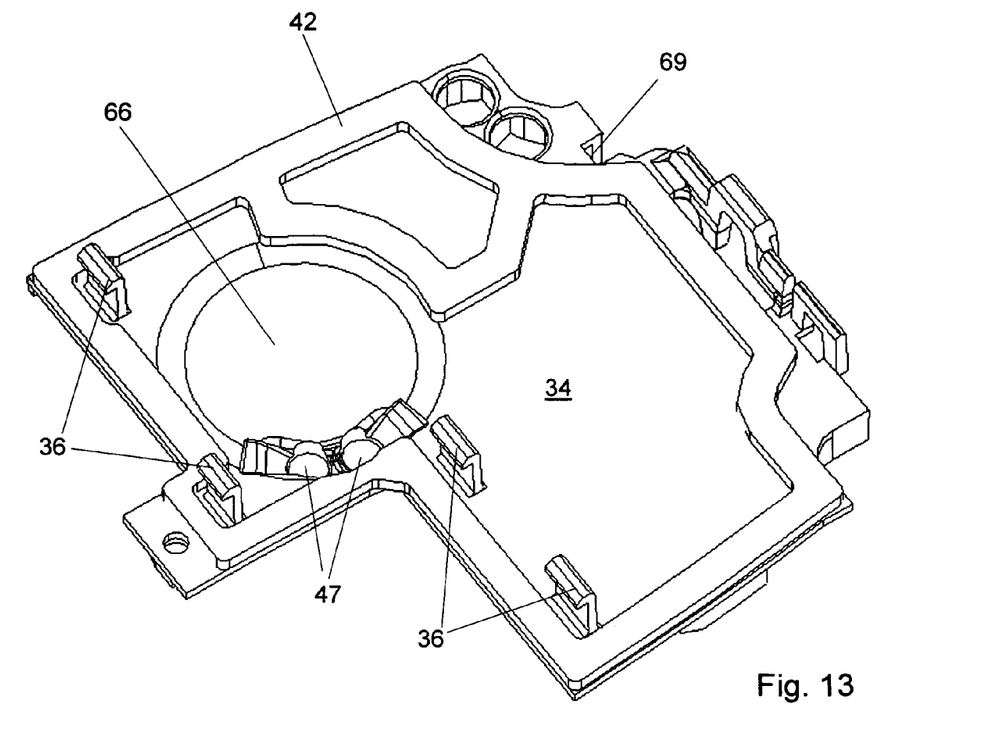
FIG. 13 is a perspective view in detail on the bottom of the removable lid shown in FIG. 12.
Figure 14:
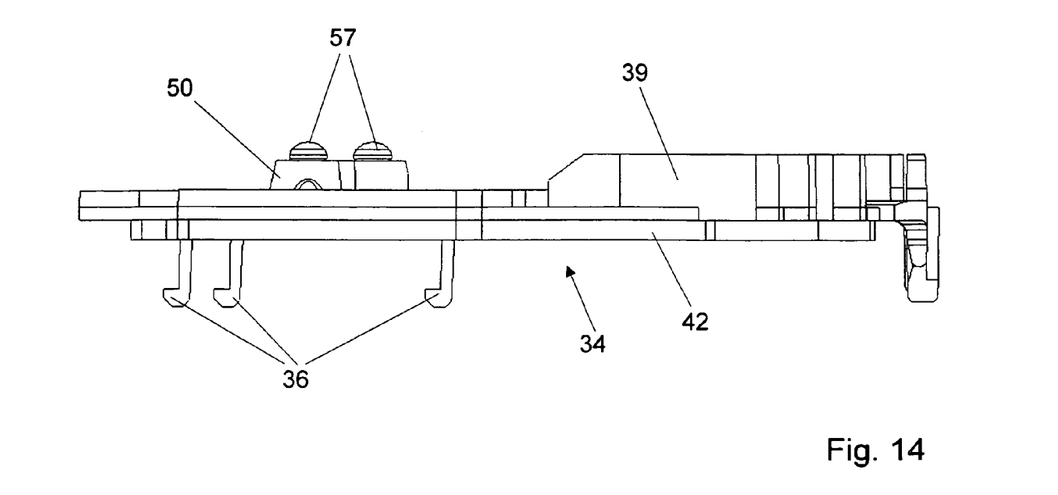
FIG. 14 is a side view of the removable lid shown in FIG. 12.

FIGS. 12 to 14 show the removable lid 34 in further detail. Four snap hooks 36 secure one side of the removable lid to the chassis 9 with sufficient pressure to compress to gasket 42 and create a seal between the chassis 9 and the side of the removable lid 34 with the snap hooks 36. The other sides of the removable lid are urged towards the chassis 9 when the printed circuit board 30 is secure to the chassis with the screws 32. The printed circuit board 30 then abuts with the ledges 38,39 and the gasket 42 is compressed to create a seal between the remainder of the edges of the removable lid 34 and the chassis 9, and the acoustic chamber 29 is sealed.

The removable lid 34 is provided with a recess 69 for receiving the small snap hook 61 that is integral with the chassis 9. The removable lid 34 also includes a slightly recessed portion 66 that matches the shape of the hands-free speaker. For maintenance, the printed circuit board 30 is removed from the chassis 9 by removing the screws 32. Then the small snap hook 61 is released and the hands-free speaker 7 can be accessed by lifting up the side of the removable lid 34 towards the small snap hook 61.

In an alternative embodiment (not shown), the lip is formed integrally with the removable lid, and the chassis is merely provided with a recessed portion that checks or mates—with or without the assistance of a gasket—with the lip. It is also possible that both the chassis and the removable lid are provided with lips that check or mate with or against one another, with or without the assistance of a gasket. The lips of the removable lid and the chassis together define the height of the acoustic chamber.

In yet another alternative embodiment (not shown), the acoustic chamber is formed inside an antenna module. The antenna module includes a recessed portion with a lip and it includes the removable lid. The antenna module is received in the chassis or a cover of the mobile phone, and the lip is urged by the printed circuit board towards the antenna module.

The above embodiments have been described with reference to a mobile phone 1 with a chassis to which user exchangeable front and rear covers are attached. It is however understood that these embodiments also apply to mobile phones or other mobile communication terminals that have no user exchangeable rear or front covers. In this case, the rear cover will take over the role of the chassis, i.e. the rear cover will be provided with a lip with which the removable lid checks, and the printed circuit board is secured to the rear cover.

The above embodiments have been described with reference to the use of three snap hooks 36 on one side of the removable lid 34. In case of a round removable lid, it is advantageous to use fewer or no snap hooks at all. Most important is the aspect that it is easy to release the removable lid 34 by lifting it from the edge opposite to the snap hooks, so that the fit of snap hooks 36 may be released by a tilting movement of the removable lid 34. It is also possible to reverse the snap hook construction, i.e. the snap hooks can be disposed on the chassis or on the rear cover and engage a protrusion of the removable lid. Further, it should be understood that the snap hooks are only one example of snap fitting connection means that can be used with the present invention.

The above embodiments have been described with reference to a lip in the form of a narrow upstanding ledge. However, the "lip" does not need to be formed by a narrow ledge, it could also be formed by an edge in the in the chassis, removable lid or antenna module. This edge could be formed by two angled surface portions of the chassis, i.e. all that is needed are two checking contact surfaces on the removable lid and the counterpart.

Although the present invention has been described in detail for purpose of illustration, it is understood that such detail is solely for that purpose, and variations can be made therein by those skilled in the art without departing from the scope of the invention.

The invention claimed is:

1. A mobile communication terminal comprising:
   at least one speaker for hands free operation; and
   an acoustic chamber with an audio outlet and a speaker received therein;
   said acoustic chamber being formed by a structural part of the mobile communication terminal in combination with a removable lid for allowing replacement of said speaker;
   a resilient gasket being disposed between said lid and said structural part where the removable lid is configured to abut a substantially rigid circuit board of the terminal so that the substantially rigid circuit board causes compression of at least part of the resilient gasket; and
   one or more snap connections configured to attach the lid to the structural part in a releasable manner.

2. A mobile communication terminal according to claim 1, wherein said structural part is a chassis of the mobile communication terminal.

3. A mobile communication terminal according to claim 1, wherein said structural part is an antenna unit.

4. A mobile communication terminal according to claim 1, wherein said structural part is a cover of the mobile communication terminal.

5. A mobile communication terminal according to claim 1, wherein the substantially rigid printed circuit board of the mobile communication terminal urges the removable lid towards said structural part.

6. A mobile communication terminal according to claim 5, wherein one or more snap connections attach the removable lid to the structural part in a releasable manner.

7. A mobile communication terminal according claim 1, wherein said removable lid comprises at least a part of walls of said acoustic chamber that extend between said lid and said structural part.

8. A mobile communication terminal according to claim 1, wherein said structural part comprises at least a part of walls of said acoustic chamber that extend between said lid and structural part.

9. A mobile communication terminal according to claim 1, wherein said removable lid comprises apertures through which electrical connectors or contacts between the speaker and the printed circuit board may extend.

10. A mobile communication terminal according claim 1, wherein an antenna is integral with the structural part.

11. A mobile communication terminal having at least one speaker for hands free operation, said mobile communication terminal comprising:
    a substantially rigid printed circuit board;
    a cover or chassis secured to the printed circuit board;
    a removable lid disposed between said printed circuit board and said cover or chassis;
    said cover or chassis and said removable lid together defining an acoustical chamber in which said speaker is received;
    said removable lid and said cover or chassis abutting along a circumference of said acoustic chamber;
    said removable lid being on at least one point along said circumference secured to said cover or chassis by a snap connection; and
    said removable lid being configured so that the substantially rigid circuit board urges the removable lid to abut with said cover or chassis.

12. A mobile communication terminal according to claim 11, wherein said removable lid is provided with at least one ledge directed towards said printed circuit board.

13. A mobile communication terminal according to claim 12, wherein said at least one ledge is disposed diametrically opposite to said snap connector.

14. A mobile communication terminal according claim 11, wherein a resilient gasket is disposed along said circumference between said removable lid and said cover or chassis.

15. A mobile communication terminal according claim 11, wherein said snap connector comprises a snap hook.

16. A mobile communication terminal according claim 15, wherein said circumference has a substantially rectangular shape, and said snap connector comprises a plurality of unidirectional snap hooks along one side of said circumference and the printed circuit board at least urging the opposite side of said circumference to abut with the cover or chassis.

17. A mobile communication terminal according claim 11, wherein said removable lid comprises at least a part of walls of said acoustic chamber that extend between said lid and said cover or chassis.

18. A mobile communication terminal according claim 11, wherein said cover or chassis comprises at least a part of walls of said acoustic chamber that extend between said lid and said cover or chassis.

19. A mobile communication terminal according claim 11, wherein said removable lid comprises apertures through which electrical connectors or contacts between the speaker and the printed circuit board extend.

20. A mobile communication terminal according claim 11, wherein an antenna is integral with the cover or chassis.

21. A mobile communication terminal according claim 11, wherein said cover is an outer cover of said mobile communication terminal.

22. A mobile communication terminal according claim 11, wherein said chassis is configured to receive an outer cover, preferably a user exchangeable outer cover.

\* \* \* \* \*